Dec. 20, 1960
R. W. KETCHLEDGE
2,965,298
SIGNAL COMPARISON SYSTEM
Filed Sept. 16, 1957
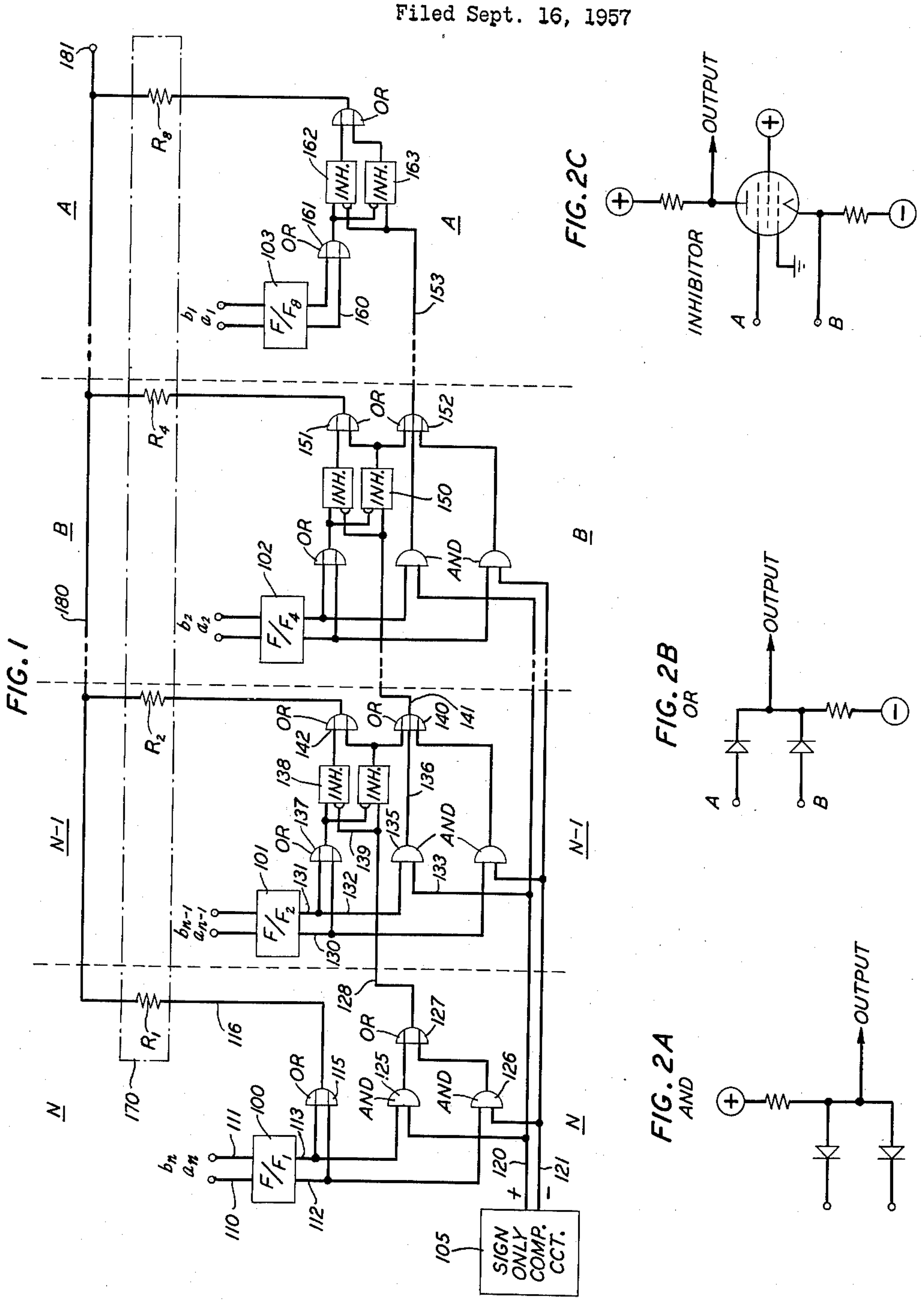
FIG. 1, FIG. 2A AND, FIG. 2B OR, FIG. 2C
INVENTOR
R. W. KETCHLEDGE
BY [signature]
ATTORNEY

United States Patent Office 2,965,298

Patented Dec. 20, 1960

2,965,298

SIGNAL COMPARISON SYSTEM

Raymond W. Ketchledge, Whippany, N.J., assignor to Bell Telephone Laboratories, Incorporated, New York, N.Y., a corporation of New York Filed Sept. 16, 1957, Ser. No. 684,010

10 Claims. (Cl. 235—175)

This invention relates to electrical signal comparison systems and more particularly to systems for comparing binary code numbers.

One of the operations which electronic information handling devices often are called upon to perform is the rapid and accurate detection of the difference between two numbers which may represent two distinct information items handled by the devices. For example, high speed cathode ray tube information storage systems are feasible only if rapid and accurate positioning of an electron beam on a storage target can be obtained in accordance with directive information fed to the beam deflection system. A binary number comparison system assures the required rapidity and accuracy. Binary numbers form the input directive information, and each position on the storage target impinged by the beam forms a discrete output binary number. Comparison of input and output numbers yield a difference signal which may be utilized to reposition the beam to the position established by the input directive information.

The binary number forms utilized in such a system and favored in most electronic information handling devices are those permitting alternate representations of each digit; viz., a binary number code in which a code group consists of a numerical sequence of any number of 0's or 1's in any permutation arrangement.

One binary number comparison system, in accordance with my application Serial No. 581,175, filed April 27, 1956, ascertains the sign of the difference between two binary numbers which sign may be used to drive a servo system for beam repositioning. Thus, given the sign of the difference between the input binary number and output binary number, the beam deflection apparatus may be energized to drive the beam in the proper direction toward the desired beam position. A sign only comparator provides a preassigned output signal with the sign resultant and steps the servo according to the magnitude of this output signal in a direction determined by the sign. A sign change in the comparator then indicates arrival at the proper beam position. Such a system necessarily is slow on large errors in which several steps are required to reach the correct beam position.

A comparator which provides the magnitude of the difference between the compared numbers as well as the sign will facilitate procurement of greater speed in servo positioning systems and will produce difference resultants for other purposes more rapidly than direct analog subtractors shown in the prior art.

It is an object of this invention to provide a high speed binary number comparison system.

It is another object of this invention to compare two numbers in conventional binary code form so as to provide an indication of the exact magnitude of their difference.

The above objects are attained in accordance with an illustrative embodiment of the invention by the simultaneous application to a multiposition comparator of the digits of a first binary number followed by the simultaneous application of the digits of a second binary number to be compared with the first binary number. Each pair of digits of corresponding significance in the numbers is applied to a distinct position or stage in the comparator. Each position provides an indication of a change produced by the second number digit acting upon the preregistered first number digit. In addition each position receives an indication of the sign of the difference between the two numbers. The latter indication may be derived from a comparator circuit, as disclosed in my priorly cited application. An output signal, weighted according to the significance of the compared digits, is provided for each comparator position according to the change and sign indications in each position and less significant digit positions. A summation of the weighted output signals provides a resultant indicative of the exact magnitude of the difference between the compared numbers.

It is a feature of this invention that two multi-digit binary code numbers to be compared be applied consecutively to a number comparator and a resultant indicative of the exact magnitude of their difference be derived from weighted signals determined by selected digit comparisons under control of the sign of their difference.

It is another feature of this invention that the digits of a first binary code number be registered simultaneously in corresponding positions in the comparator and the digits of a second binary code number be applied simultaneously to the corresponding positions in the comparator to change the registration effected by the first binary code number, the change providing a comparison indication for each position.

It is another feature of this invention that the comparison indication for each position together with an indication of the sign of the difference between the compared numbers assists in determining the weighted output signals from more significant digit positions.

A complete understanding of this invention and of these and various other features thereof may be gained from consideration of the following detailed description and the accompanying drawing, in which:

Fig. 1 is a schematic representation of one embodiment of this invention; and

Fig. 2 illustrates simple schematic representations of various logic circuits which may be employed in the embodiment of Fig. 1.

Referring now to the circuit of Fig. 1, digits of a first conventional binary code number $a_1a_2a_{n-1}a_n$, representing the minuend of the comparison are applied simultaneously to the flip-flop circuits 103, 102, 101 and 100 in the corresponding positions A, B, $N-1$ and N of the comparison circuit. The positions are shown in reverse order in Fig. 1 for convenience in describing the operation hereinafter. The two compared numbers are not limited to the four-digit length illustrated but may comprise any number of digits. For each additional pair of digits of corresponding significance in the compared numbers, positional circuitry, such as that in position B, is added to the comparator.

The digit $a_n$ in this instance is the least significant digit of the minuend number and is applied to flip-flop 100, the input to the least significant digit comparison position. Upon registration in the flip-flop circuits of the minuend, the digits of a second conventional binary code number $b_1b_2b_{n-1}b_n$, representing the subtrahend of the comparison, are applied simultaneously to the corresponding flip-flop circuits 103–100, serving to change the flip-flop settings as registered by the minuend number.

Since the digit characters of a binary number are 0 and 1, such characters may be represented by the voltage relation positive and negative on two conductors. Thus the binary character 0 may be represented in conductors 110 and 111 at the input of flip-flop circuit 100; for example, by the relation of conductor 110 positive and conductor 111 negative. The binary character 1, in turn, may be represented by conductor 110 negative and conductor 111 positive.

The flip-flop circuits 100–103, which may be used in such a system, are well known and serve to register the state of the voltages received on their input leads. The output leads from the flip-flop circuits are energized by a change in the state of the flip-flop circuit. For example, if the flip-flop circuit 100 receives an $a_n$ digit 1, it will register a positive voltage on the side connected to input lead 111. If, thereafter, a $b_n$ digit 0 is applied, a positive voltage will be received over input lead 110, the digit mismatch serving the reverse the state of the flip-flop circuit 100 and resulting in an output signal on lead 112. Similarly, an opposite mismatch of successive input digits $a_n$ and $b_n$ of 0 and 1, respectively, will activate flip-flop circuit 100 to provide an output signal on lead 113. Should matching successive input digits be applied to the flip-flop circuit 100, no output signal will result on either of the output leads 112 or 113. The flip-flop circuits 101, 102 and 103 in the more significant digit comparison positions will react in a similar manner, producing output signals only upon the occurrence of a change or mismatch in successive input digits.

The compared binary numbers are also applied to a "sign only" comparison circuit 105 which may be of the type disclosed in my application Serial No. 581,175, filed April 27, 1956. The positive or negative resultant of the sign only comparison is transmitted to the circuit of Fig. 1 over one of leads 120 or 121. The output of the flip-flop circuit in each digit comparison position is applied to an OR gate in an output portion and two AND gates in a carry portion, the latter gates also receiving a signal representing the sign of the difference between the compared numbers.

Figs. 2A and 2B, respectively, illustrate typical AND and OR gates utilizing diodes. The AND and OR gates in the circuit of Fig. 1 may take these or comparable forms, as desired. Each AND gate, shown as a clear semicircle in Fig. 1, is arranged to provide an output signal only if signals are present simultaneously at all of the inputs thereto. Each OR gate, shown as a semicircle traversed by the input leads in Fig. 1, provides an output signal if a signal is present on at least one of the inputs thereto.

Also shown in the output portions of positions A, B and $N-1$ of Fig. 1 are inhibit gates or inhibitors receiving input signals from the flip-flop circuit in the same position and the carry section of the next less significant digit comparison position. An example of an inhibitor utilizing a pentode is illustrated in Fig. 2C. Each inhibitor, designated INH in Fig. 1, provides an output signal if a signal is present on one of its input leads and not on its other, inhibit, input lead.

Each position A–N also comprises a weighting portion shown as analog converter 170 having a distinct weighting portion $R_8$, $R_4$, $R_2$ and $R_1$ receiving the output signals from the corresponding digit comparison positions. Thus an output signal from any digit comparison position will receive a distinct weighting corresponding to the significance of the digits compared in that position.

A comparison of two input numbers in conventional binary code will serve to demonstrate the operation of the circuit of Fig. 1. Assume that the number 12 is to be compared with the number 6, the former being the reference number or minuend. Table I illustrates the elements of the problem:

I

| Decimal | | Conventional Binary | | | | |
|---|---|---|---|---|---|---|
| | Weighting | 8 | 4 | 2 | 1 | |
| | Position | A | B | N−1 | N | |
| 12 | $a_1a_2a_{n-1}a_n$ | 1 | 1 | 0 | 0 | |
| 6 | $b_1b_2b_{n-1}b_n$ | 0 | 1 | 1 | 0 | |
| +6 | Result | | +4 | +2 | | =+6 |

The correct resultant is +6. The plus sign is determined by the "sign only" comparison circuit, shown in my application cited hereinbefore, and the circuit of Fig. 1 must provide a difference magnitude output signal having a binary weighting of 6.

Beginning with the least significant digit comparison position N, the $a_n$ digit 0 is registered in the flip-flop circuit 100. The $b_n$ digit signal 0 received thereafter provides a digit match which fails to switch the flip-flop 100, so that no output signal is produced. OR gate 115 thus fails to provide an output signal on lead 116. A signal on the plus sign lead 120 is transmitted to AND gates 125 and 126. Each of the AND gates fails to provide an output signal lacking input signals on each of their other input leads from flip-flop 100. OR gate 127, in turn, fails to provide an output signal on "carry" lead 128 to the next more significant digit comparison position $N-1$.

Position $N-1$ receives the $a_{n-1}$ digit 0 and registers it in flip-flop 101. The $b_{n-1}$ digit 1 is then received, serving to switch the priorly registered digit in flip-flop 101 and to provide an output signal on lead 131 to signify the digit mismatch. The signal on lead 131 is transmitted to AND gate 135 over lead 132, which also receives the plus sign signal on lead 120 over lead 133 and is activated to provide an output on lead 136. OR gate 140 is activated by the signal on lead 136 to provide an output signal on carry lead 141 to the next more significant digit comparison position B.

The output of flip-flop 101 on lead 131 also passes through OR gate 137 to inhibitor 138. Inhibit lead 139 to inhibitor 138 is normally activated by a signal on carry lead 128 from the least significant digit comparison position N but, lacking a signal on this lead, as described in connection with the operation in position N, inhibitor 138 provides an output signal which passes through OR gate 142 and through the $R_2$ section of analog converter 170. An output signal having a weighting corresponding to the significance of the digits compared in position $N-1$, in this instance a weighting of 2, thus is provided on output lead 180.

Flip-flop 102 in position B registers the $a_2$ digit 1 which is not changed by the $b_2$ digit 1 entered thereafter, so that no output signal from flip-flop 102, indicating a change in the input digits, is forthcoming. The signal on carry lead 141 from position $N-1$ is transmitted to inhibitor 150. The output of flip-flop 102 in position B would normally provide an inhibit signal at the other input of inhibitor 150, but with a digit match in position B in this instance, the inhibit signal is lacking and inhibitor 150 delivers an output signal through OR gate 151 and the $R_4$ section of analog converter 170. Thus an output signal having a weighting corresponding to the significance of digits compared in position B, a weighting of 4 in this instance, is provided on output lead 180. The output of inhibitor 150 also passes through OR gate 152 to provide a signal on carry lead 153 to the next more significant digit comparison circuit A.

Position A receives the $a_1$ digit 1 and the $b_1$ digit 0 in succession. Flip-flop 103 is activated by this mismatch in input digits to provide an output on lead 160 which passes through OR gate 161 to inhibitors 162 and 163. Thus the inhibit leads to both inhibitors 162 and 163 are activated to prevent output signals therefrom and no output signal is forthcoming from position A.

The output signals from positions $N-1$ and B are advantageously in the form of analog voltages which add on output lead 180 to form the desired exact difference magnitude resultant of 6 at the output terminal 181.

It is to be understood that the above-described arrangement is illustrative of the application of the principles of the invention. Numerous other arrangements may be devised by those skilled in the art without departing from the spirit and scope of the invention.

What is claimed is:

1. An electrical circuit for indicating the difference magnitude of two multidigit binary numbers comprising a plurality of comparison circuits each corresponding to a distinct digit position in the two numbers, means for applying digits of like significance in said two numbers to individual of said comparison circuits, means for providing first signals in each of said comparison circuits indicative of the relative magnitude of each pair of compared digits, means for applying a second signal to each of said comparison circuits indicative of the relative magnitudes of said numbers, means in each of said comparison circuits responsive to receipt of said first and second signals to provide a third signal to the circuit comparing the next more significant digits, an output terminal, and means in each of said comparison circuits connected to said output terminal and responsive to one of said first or third signals to provide an output signal to said output terminal.

2. A binary number comparator for indicating the exact difference magnitude of first and second binary numbers comprising a plurality of comparison positions corresponding in significance to the digits of said binary numbers, means for registering the digits of the first number in the corresponding comparison positions, means for applying the digits of the second number to said registering means in the corresponding comparison positions, each of said registering means responsive to a change in registration upon receipt of said second number digit to provide a first signal indicating the sign of the change, logic means in each of said comparison positions connected to said registering means, means for applying a second signal representing the sign of the difference between said first and second numbers to said logic means, said logic means responsive to concurrent receipt of said first and second signals indicating the same sign to transmit a third signal to the next more significant digit comparison position, an output terminal and distinct weighting means connected between each of said comparison positions and said output terminal, each of said comparison positions responsive only to one of said first or third signals to transmit an output signal to said weighting means.

3. Apparatus for determining the difference between two binary numbers comprising a plurality of comparison stages, each stage corresponding to a digit position of distinct significance in the binary numbers and comprising a digit register, carry means and output means, means for applying the digits of one number to the respective digit registers having preregistered therein the digits of the other number, means for applying a signal indicative of a mismatch between consecutively registered digits from said digit register to said carry and output means, means for applying a signal representing the sign of the difference between said numbers to said carry means, means for applying a signal from said carry means to said output means in a more significant digit comparison stage in response to concurrent receipt by said carry means of said sign signal and said mismatch signal, an output terminal, and means for applying output signals from each comparison stage to said output terminal in response to receipt in said output means of one of said mismatch and carry signals.

4. Apparatus in accordance with claim 3 wherein said digit register comprises flip-flop switching means having two inputs and two outputs, one input receiving binary digits of one type and the second input receiving digits of the opposite type, consecutive receipt of digits at opposite inputs indicating a mismatch and switching said flip-flop to provide a signal at one of said outputs dependent upon the direction of the mismatch.

5. Apparatus in accordance with claim 4 wherein said means for applying a signal from said digit register to said carry and output means comprises first and second leads, said first lead transmitting a signal indicative of a first mismatch and said second lead transmitting a signal indicative of an opposite mismatch.

6. Apparatus in accordance with claim 5 wherein said means for applying a signal representing the sign of the difference between said numbers comprises third and fourth leads, said third lead transmitting a signal indicative of a positive difference and said fourth lead transmitting a signal indicative of a negative difference.

7. Apparatus in accordance with claim 6 wherein said carry means comprises first and second AND gates, said first AND gate being connected to said first and third leads and said second AND gate being connected to said second and fourth leads.

8. Apparatus in accordance with claim 7 wherein said output means in said stages other than the least significant digit comparison stage comprises first and second inhibitors, said means for applying a signal from said carry means to said output means being connected to an input of said first inhibitor and the inhibit input of said second inhibitor, said means for applying a signal from said digit register to said output means being connected to an input of said second inhibitor and the inhibit input of said first inhibitor.

9. Apparatus in accordance with claim 8 and further comprising means connected between said output means in each stage and said output terminal for weighting the output signals in an amount corresponding to the significance of the digits compared in each stage.

10. Apparatus in accordance with claim 9 wherein said weighting means comprises analog means for providing outputs corresponding in significance to that of the compared binary digits in response to uniform output signals from each comparison stage output means.

References Cited in the file of this patent

UNITED STATES PATENTS

| | | |
|---|---|---|
| 2,685,084 | Lippel | July 27, 1954 |
| 2,780,409 | Hardenberg | Feb. 5, 1957 |
| 2,907,877 | Johnson | Oct. 6, 1959 |

OTHER REFERENCES

Nettel: "Digital Methods in Control Systems," Electronic Engineering, v. 28, No. 337, pages 108–114, March 1956.